US008534918B2

(12) United States Patent  
Hsu et al.

(10) Patent No.: US 8,534,918 B2  
(45) Date of Patent: Sep. 17, 2013

(54) SEMIAUTOMATIC SLIDE MECHANISM (75) Inventors: An Szu Hsu, New Taipei (TW); Chien Cheng Mai, New Taipei (TW); Chien Yu Lin, New Taipei (TW)

(73) Assignee: First Dome Corporation, New Taipei (TW)

( * ) Notice: Subject to any disclaimer, the term of this patent is extended or adjusted under 35 U.S.C. 154(b) by 160 days.

(21) Appl. No.: 13/170,222

(22) Filed: Jun. 28, 2011

(65) Prior Publication Data

US 2013/0004102 A1    Jan. 3, 2013

(51) Int. Cl.
*F16C 29/02*    (2006.01)
*F16C 17/00*    (2006.01)

(52) U.S. Cl.
USPC ... 384/26; 384/7; 384/20; 384/40; 312/334.1; 312/334.13

(58) Field of Classification Search
USPC .......... 384/7, 26, 36, 40, 20, 21; 16/69, 16/359, 361–362, 334–336; 361/679, 725; 312/294, 333, 334.1, 334.13
See application file for complete search history.

(56) References Cited

U.S. PATENT DOCUMENTS

| 3,524,382 | A | * | 8/1970 | Artaud | 407/45 |
| 5,752,757 | A | * | 5/1998 | Choi | 361/724 |
| 5,833,158 | A | * | 11/1998 | Suzuki et al. | 242/336 |
| 7,393,068 | B2 | * | 7/2008 | Sato et al. | 312/333 |
| 7,843,698 | B2 | * | 11/2010 | Takizawa et al. | 361/732 |
| 7,869,207 | B2 | * | 1/2011 | Zhang et al. | 361/679.55 |
| 2006/0143631 | A1 | * | 6/2006 | Watanabe | 720/621 |
| 2007/0279847 | A1 | * | 12/2007 | Li et al. | 361/679 |
| 2009/0323278 | A1 | * | 12/2009 | Lu | 361/679.55 |
| 2010/0022286 | A1 | * | 1/2010 | Wang et al. | 455/575.4 |
| 2010/0031468 | A1 | * | 2/2010 | Tomiji et al. | 16/52 |
| 2010/0083292 | A1 | * | 4/2010 | Azai | 720/621 |
| 2011/0211779 | A1 | * | 9/2011 | Lee | 384/26 |

FOREIGN PATENT DOCUMENTS

| JP | 07192384 A | * | 7/1995 |
| JP | 11013328 A | * | 1/1999 |

* cited by examiner

*Primary Examiner* — Marcus Charles
(74) *Attorney, Agent, or Firm* — Rosenberg, Klein & Lee (57) ABSTRACT

A semiautomatic slide mechanism includes a slide board and a slide seat slidably connected therewith. The slide board is formed with a slide rail divided into a first slot and a second slot for early half and later half of the sliding travel. Two racks are disposed on different sides of the first and second slots. The slide seat is formed with a guide slot. A guide member is slidably disposed on the slide seat corresponding to the guide slot. An elastic member is disposed in the guide member. A driving spring member is disposed on the slide seat for driving the guide member. A gear is disposed between the slide board and the slide seat and engaged with one of the racks. The gear has a shaft member connected with the driving spring member and the elastic member and slidably extending through the guide slot and the slide rail.

29 Claims, 6 Drawing Sheets

SEMIAUTOMATIC SLIDE MECHANISM

BACKGROUND OF THE INVENTION

1. Field of the Invention

The present invention relates generally to a semiautomatic slide mechanism, and more particularly to a semiautomatic slide mechanism applied to a portable electronic device.

2. Description of the Related Art

Following the development of various mobile techniques, different types of progressive portable electronic products have been developed. Also, users have more and more strictly required various lightweight, miniaturized, convenient-use and long-lifetime mobile electronic devices. Recently, large-size portable electronic products have become more and more popular. Such large-size portable electronic products are even more strictly required to have the above advantages. For example, many designs of the slide cover mechanism concept of a common slide cover mobile phone have been directly applied to the large-size portable electronic products such as tablet mobile phones and tablet computers. The slide cover mechanism of an early-stage mobile phone generally includes a slide board and a slide seat adapted to the slide board. The slide board is slidable relative to the slide seat. At least one elastic member is disposed between the slide board and the slide seat to provide elasticity between the slide board and the slide seat. The slide board is generally fixedly connected with a cover body, while the slide seat is fixedly connected with a main body. An operator can operate the slide board to slide relative to the slide seat. After the slide board slides by a certain distance, the elastic member stores elastic potential energy for the slide board to automatically slide to the end of the travel.

In the case that the currently most often seen slide cover mechanism is directly applied to a large-size tablet computer, personal digital assistants (PDA) or electronic book, it often takes place that the slide cover can be hardly smoothly slid due to over-tightening of the cooperative components. In some other cases, the slide cover will deflect during sliding due to too large gap between the components. In addition, with respect to the elastic member such as (torque spring) in the slide cover mechanism of the mobile phone, the elastic member is generally made of a small-diameter fine metal wire. In the case that such elastic member is directly applied to a large-size electronic device, the slide cover mechanism will have insufficient fatigue strength. After a period of use, the elastic member will deform or break due to elastic fatigue. This needs to be improved.

In order to solve the problems existing in the early-stage slide cover mechanism, another type of conventional slide cover mechanism has been developed. The slide cover mechanism includes a slide board and a slide seat. The slide seat is relatively slidably disposed on the slide board. The slide cover mechanism further includes a gear, two racks, an elastic member and an engagement body. The racks are respectively disposed on two sides of the slide board in different sliding travels. The gear is disposed between the slide board and the slide seat in cooperation with the racks. The slide board is formed with a slide slot. The slide seat is formed with a guide hole. The gear is formed with a shaft hole. One end of the engagement body is passed through the guide hole and the shaft hole of the gear and slidably engaged in the slide slot of the slide board. The elastic member can be a clockwork-type elastic member. One end of the elastic member is fixedly connected with the gear, while the other end of the elastic member is fixedly engaged with the engagement body. When an external force is applied to the slide seat to make the slide seat slide, the elastic member stores elastic potential energy with the rotation of the gear driven by the racks. After the gear rotates to separate from one of the racks, the gear further engages with the other rack. At this time, the elastic member releases the elastic potential energy conserved in the foregoing travel. In this case, the slide seat will automatically slide in the original sliding direction to the end of the travel, and vice versa.

In comparison with the early-stage conventional slide cover mechanism, the above slide cover mechanism adopts the gear and the cooperative racks and the elastic member wound between the gear and the engagement body passing through the guide hole of the slide seat. Accordingly, under external force, the gear can gradually wind up the elastic member to store elastic potential energy. In addition, under the guiding of the slide slot, the gear can move from one rack for the early half of the travel to the other rack for the later half of the travel. At the later stage of the travel, the elastic member releases the elastic potential energy conserved at the early stage of the travel to make the slide seat automatically continuously slide to the end of the travel.

However, in practice, it is found that the combination of the gear and the racks has a shortcoming as follows: The distance between the racks is designed to be larger than the diameter of the gear so as to avoid self-locking of the gear in the middle of the travel at the junction between the two-way racks or prevent the gear from failing to engage with the rack for the later half of the travel. Moreover, at the junction between the two racks, the slide slot is guided via a biased slot from a path distal to the rack for the early half of the travel to a path distal to the rack for the later half of the travel. Therefore, at the junction between the two racks, the gear will displace away from the rack for the early half of the travel to the rack for the later half of the travel. Accordingly, the gear can be more smoothly engaged with the racks. However, in practice, it is found that the elastic member often releases most of the elastic potential energy after the gear is disengaged from the rack for the early half of the travel but when not yet fully engaged with the rack for the later half of the travel. As a result, in operation, it often takes place that the slide cover cannot truly automatically slide to the end of the travel.

SUMMARY OF THE INVENTION

It is therefore a primary object of the present invention to provide a semiautomatic slide mechanism, in which in the sliding process, the gear can be more truly transitionally engaged between two racks to complete the semiautomatic sliding travel of the slide cover.

To achieve the above and other objects, the semiautomatic slide mechanism of the present invention includes a slide board and a slide seat slidably connected with the slide board. The slide board is formed with a slide rail divided into a first slot and a second slot for early half and later half of the sliding travel respectively. Two racks are disposed on different sides of the first and second slots. The slide seat is formed with a guide slot. In addition, a guide member is slidably disposed on the slide seat corresponding to the guide slot. An elastic member is disposed in the guide member. A driving spring member is disposed on the slide seat for normally elastically driving the guide member toward the racks. A gear is disposed between the slide board and the slide seat and engaged with one of the racks. The gear has a shaft member connected with the driving spring member and the elastic member and slidably extending through the guide slot and the slide rail. Accordingly, the gear can instantaneously disengage from the rack for the early half of the travel and instead engage with the rack for the later half of the travel. In this case, in the transition process, the elastic member can truly fully release the energy stored in the early half of the travel to facilitate the later half of the travel and complete the semiautomatic sliding process.

The present invention can be best understood through the following description and accompanying drawings, wherein:

DETAILED DESCRIPTION OF THE PREFERRED EMBODIMENT

Figure 1:
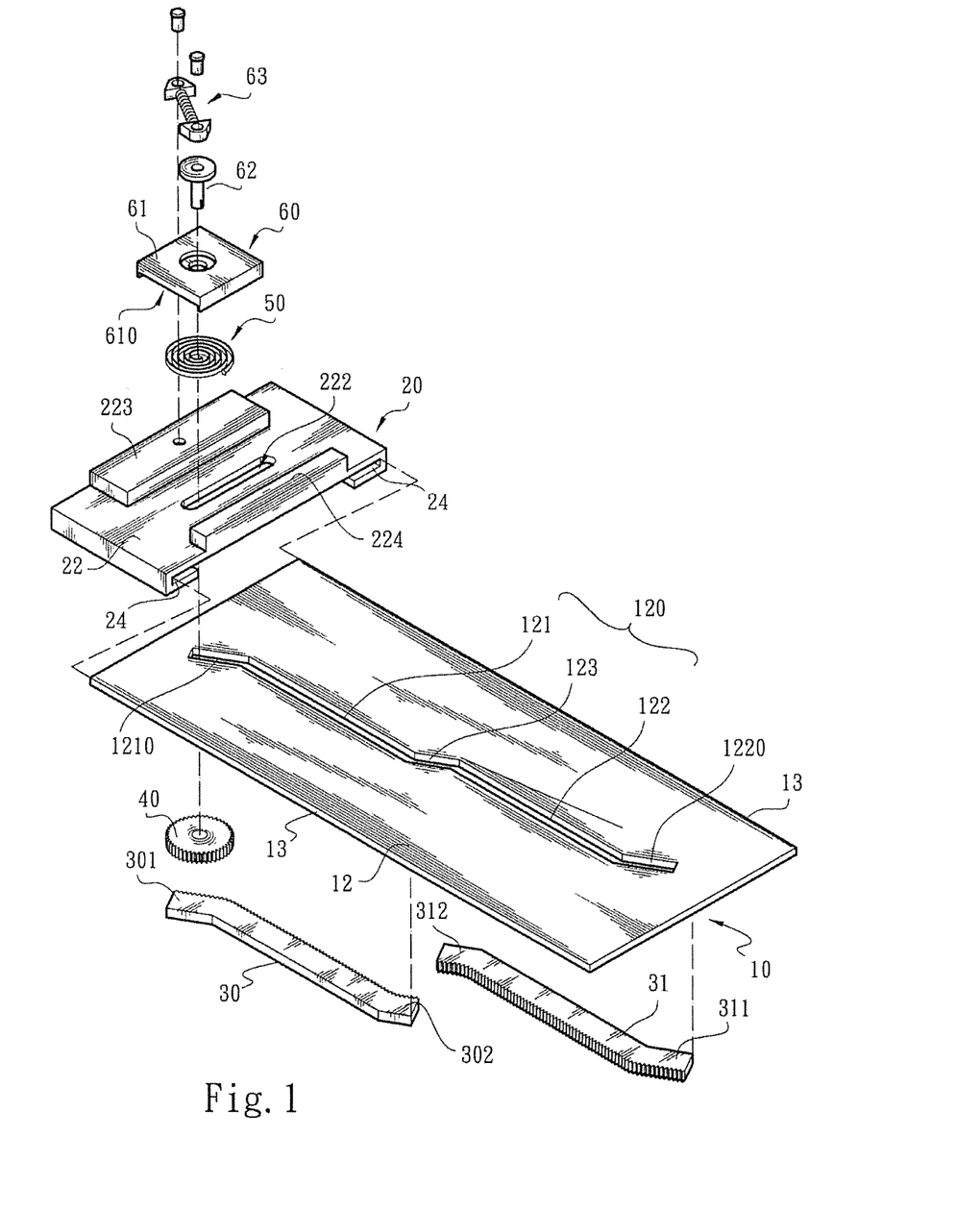
FIG. 1 is a perspective exploded view of a preferred embodiment of the present invention.
Figure 2:
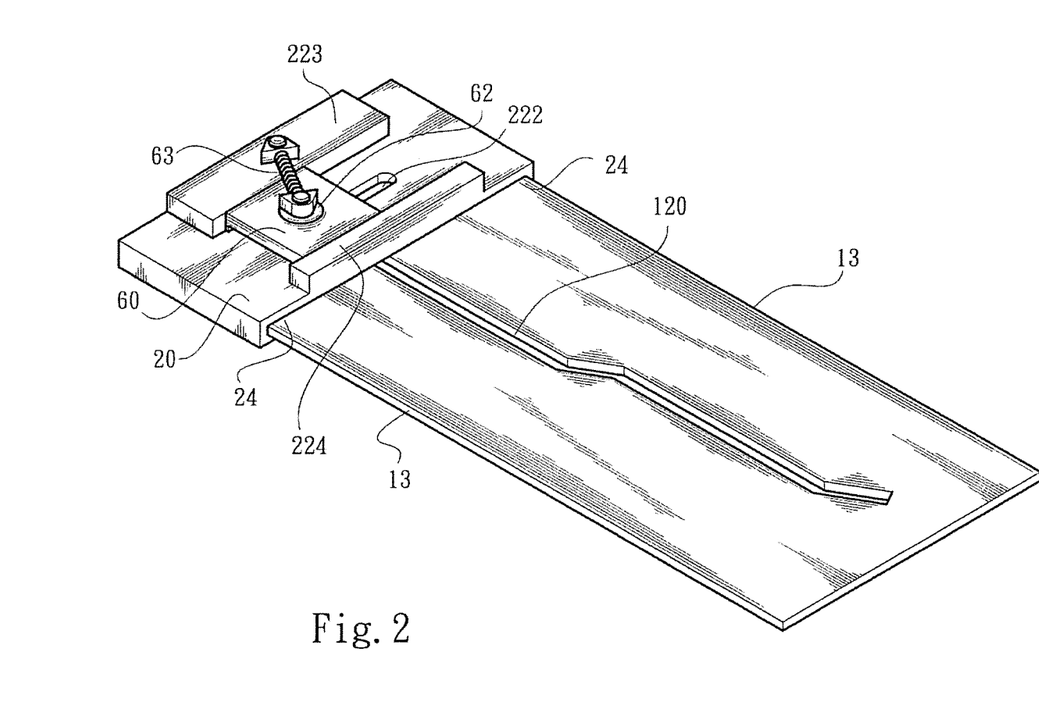
FIG. 2 is a top perspective assembled view of the preferred embodiment of the present invention.
Figure 3:
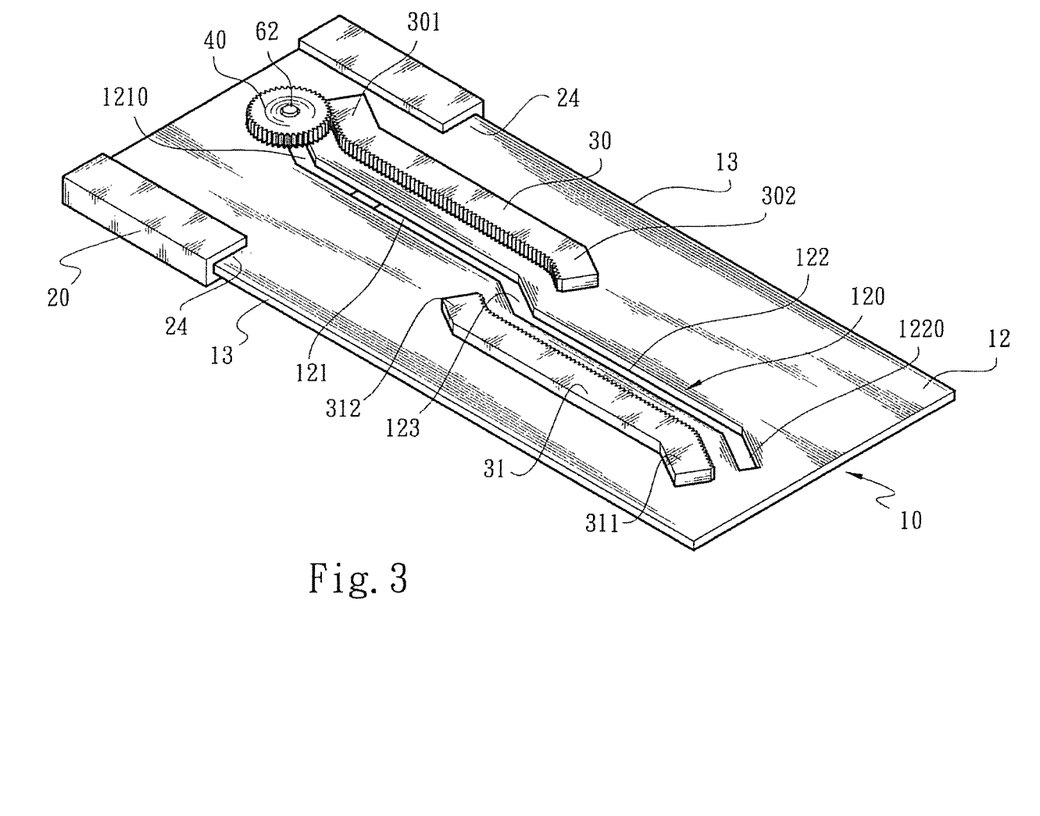
FIG. 3 is a bottom perspective assembled view of the preferred embodiment of the present invention.
Figure 4:
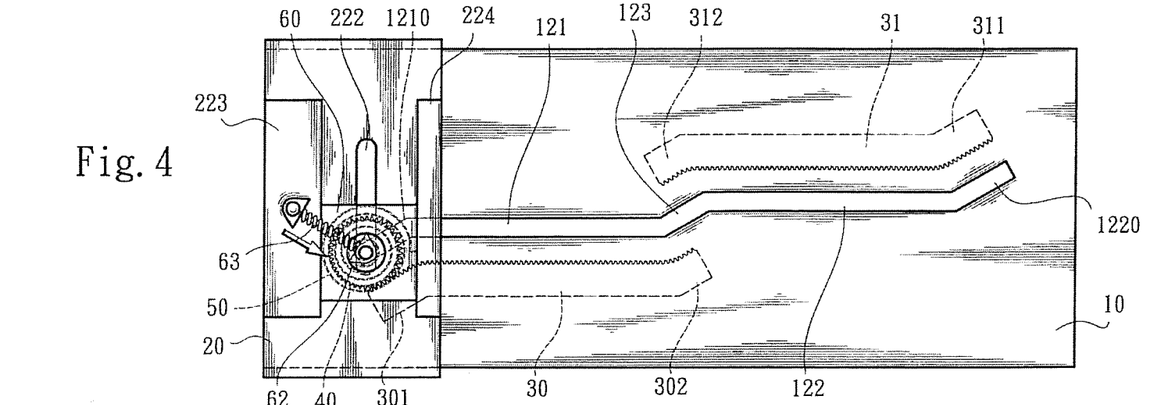
FIG. 4 is a plane view of the preferred embodiment of the present invention, showing that the slide seat of the present invention is positioned at a start point of the travel.
Figure 5:
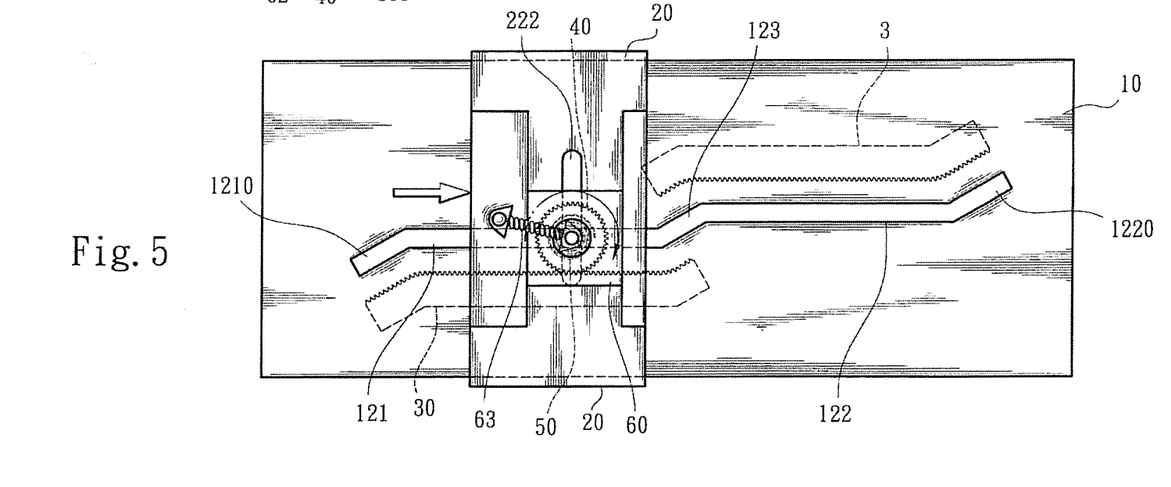
FIG. 5 is a plane view of the preferred embodiment of the present invention, showing an early half of the travel of the slide seat of the present invention.
Figure 6:
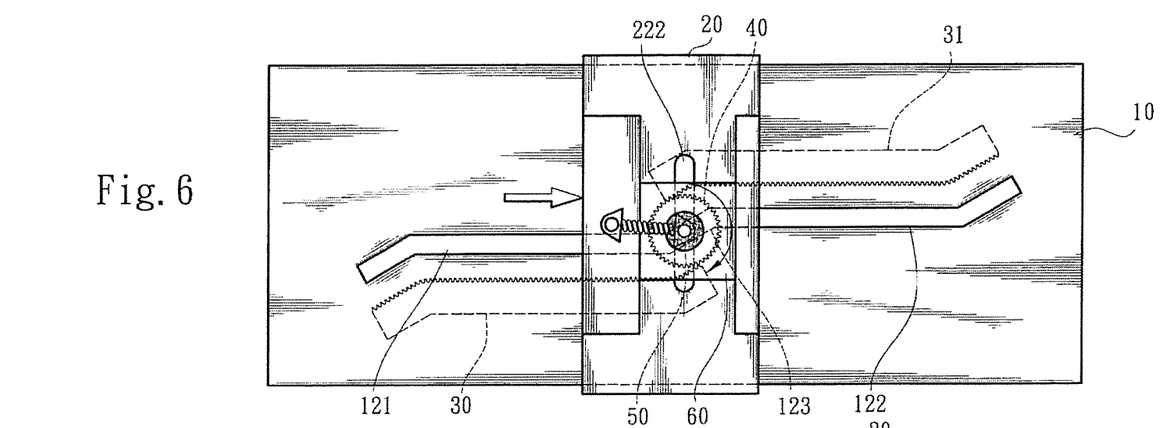
FIG. 6 is a plane view of the preferred embodiment of the present invention, showing the transition stage of the travel of the slide seat of the present invention.
Figure 7:
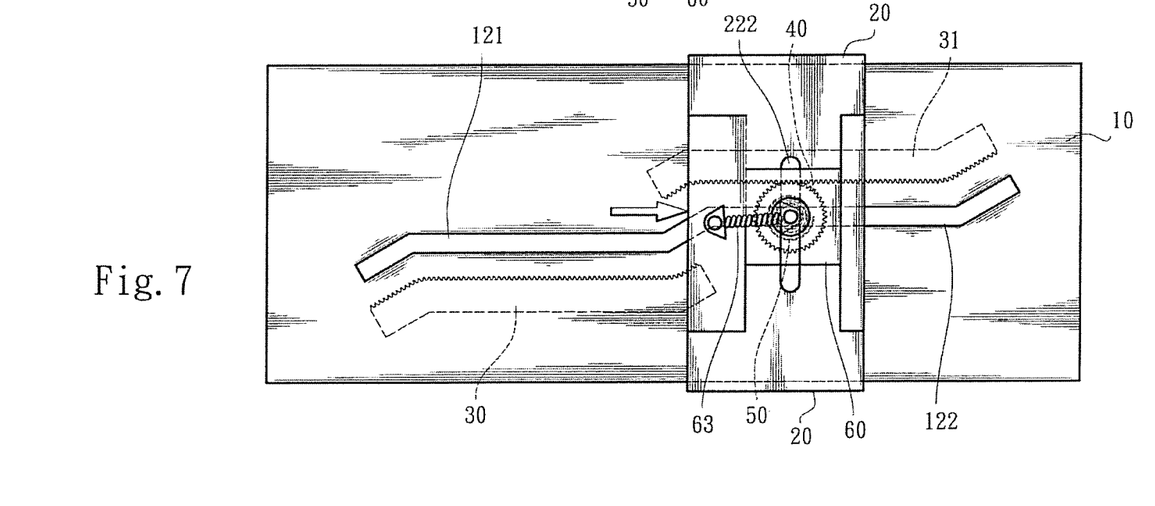
FIG. 7 is a plane view of the preferred embodiment of the present invention, showing a later half of the travel of the slide seat of the present invention.
Figure 8:
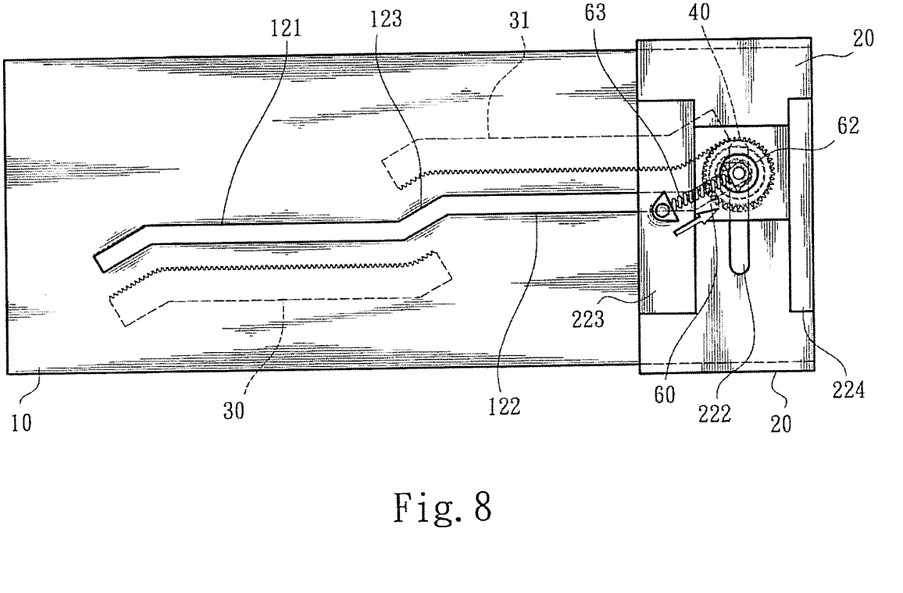
FIG. 8 is a plane view of the preferred embodiment of the present invention, showing that the slide seat of the present invention reaches an end point of the travel.

Please refer to FIGS. 1 to 3. According to a preferred embodiment, the semiautomatic slide mechanism of the present invention includes a slide board 10, a slide seat 20, two racks 30, 31, a gear 40, an elastic member 50, (which can be a clockwork-type spring), and a guide member 60.

The slide board 10 includes a board section 12 and guide rails 13 disposed on two sides of the board section 12. The board section 12 is formed with a slide rail 120 extending in a sliding direction of the slide seat 20 relative to the slide board 10. The slide rail 120 extends from a first end of the board section 12 or a portion of the board section 12 adjacent to the first end to a second end of the board section 12 or a portion of the board section 12 adjacent to the second end. The slide rail 120 can be divided into a first and a second slots 121, 122 non-colinear with each other and a biased slot 123 interconnected between the first and second slots 121, 122. In this embodiment, the first and second slots 121, 122 are two straight slots in parallel to, but non-colinear with each other. Alternatively, at least one of the first and second slots 121, 122 is a straight slot or nonlinear slot. In addition, deflective locating slots 1210, 1220 are respectively formed at a head end of the first slot 121 and a tail end of the second slot 122, which tail end is most distal from the head end of the first slot 121. The first and second slots 121, 122 are parallel to the guide rails 13 of two sides of the slide board 10 respectively. The two racks 30, 31 are disposed on the board section 12 corresponding to guide sides of the first and second slots 121, 122 respectively. The tracks of the toothed sides of the racks 30, 31 are both substantially varied with the path (track) of the corresponding slide rail 120. Especially, locating ends 301, 311 are respectively formed at a head end of the rack 30 and a tail end of the rack 31 corresponding to the locating slots 1210, 1220 respectively. The locating ends 301, 311 are deflected in the same direction as the locating slots 1210, 1220. Opposite deflective transition ends 302, 312 are respectively formed at a tail end of the rack 30 and a head end of the rack 31 corresponding to the biased slot 123, which head end is most proximal to the tail end of the rack 30.

The slide seat 20 includes a seat section 22 and two guide channels 24 slidably fitted on the guide rails 13 of the slide board 10. A middle portion of the seat section 22 is formed with a guide slot 222. The guide slot 222 has a length at least equal to an allowable displacement of the total travel of the slide rail 120. The guide member 60 is disposed on the seat section 22 corresponding to the guide slot 222. As shown in the drawings, the guide member 60 can be a frame box 61 having an internal receiving space 610. The elastic member 50 is mounted in the receiving space 610. One end of the elastic member 50 is affixed to the guide member 60, while the other end of the elastic member 50 is connected to a gear shaft member 62. The shaft member 62 is drivable by one end of a driving spring member 63. The other end of the driving spring member 63 is pivotally connected to the slide seat 20. Preferably, the pivot point of the driving spring member 63 is positioned in the middle line between the two slots 121, 122. Accordingly, the driving spring member 63 normally guides the guide member 60 and the shaft member 62 to displace away from the middle line. In addition, in practice, guide islands 223, 224 are disposed on the slide seat 20 in parallel to the guide slot 222 for restricting and guiding the guide member 60.

The gear 40 is disposed on the slide board 10 in a position where the gear 40 is engaged with at least one of the racks 30, 31. The shaft member 62 is passed through the guide member 60 and the guide slot 222 of the slide seat 20 and serially connected to a center of the gear 40 with one end of the shaft member 62 slidably inlaid in the slide rail 120. When a force is applied to the gear 40 to make the gear 40 rotate, the elastic member 50 is driven and gradually tensioned to store energy.

According to the above arrangement, the slide seat 20 can be slid relative to the slide board 10 in the sliding direction by a travel as shown in FIGS. 4 to 8. That is, when the slide seat 20 starts to gradually slide from one end of the slide board 10 to the other end thereof, the gear 40 is engaged with the rack 30 for the early half of the travel and drivingly rotated by the rack 30. In the meantime, the shaft member 62 is synchronously rotated to gradually drive and tension the elastic member 50 for storing energy. When the slide seat 20 is slid to the biased slot 123 in the middle of the slide rail 120, the shaft member 62 is guided by the biased slot 123, whereby the gear 40 is gradually moved toward the rack 31 for the later half of the travel. When the center of the shaft member 62 passes over the middle line between the first and second slots 121, 122, the driving spring member 63 applies an action force to the gear 40 to instantaneously guide the gear 40 and deflect the moving direction of the gear 40. Accordingly, the gear 40 instantaneously disengages from the rack 30 for the early half of the travel and instead engages with the rack 31 for the later half of the travel. In this case, in the transition process, the elastic member 50 can truly fully release the stored energy to facilitate the later half of the travel.

When the gear 40 transitionally engages with the rack 31 for the later half of the travel, the rack 31 applies an action force to the gear 40 in a direction reverse to that of the rack 30 for the early half of the travel. Therefore, when the elastic member 50 releases the energy stored in the early half of the travel, the gear 40 is continuously moved forward to automatically push the slide seat 20 relative to the slide board 10 and complete the later half of the travel. When a user operates the slide seat 20 in a reverse direction from the state of FIG. 8 to the state of FIG. 4, the aforesaid later half of the travel becomes an early half of the travel, while the original early half of the travel becomes a later half of the travel. Accordingly, the operation can be circularly performed to achieve the same semiautomatic sliding effect.

In addition, the outward deflected locating slots 1210, 1220 and locating ends 301, 311 at the most distal ends of the sliding path serve to provide a guide path more adaptive to the direction of the push force applied by the driving spring member 63 to the shaft member 62. Under such circumstance, the shaft member 62 can be naturally kept at the locating ends to locate the slide seat 20 at the ends of the travel.

The above embodiment is only used to illustrate the present invention, not intended to limit the scope thereof. Many modifications of the above embodiment can be made without departing from the spirit of the present invention.

What is claimed is:

1. A semiautomatic slide mechanism comprising a slide board and a slide seat connected with the slide board and slidable relative to the slide board, the slide board being formed with a slide rail extending in a relative sliding direction of the slide seat, the slide rail being divided into a first and a second slots non-colinear with each other and a biased slot interconnected between the first and second slots, a first and a second racks being respectively disposed on different sides of the first and second slots with the toothed sides of the first and second racks facing the first and second slots, a gear being engaged with the first rack, a shaft member being connected to a center of the gear, one end of the shaft member being slidably inlaid in the slide rail, the slide seat including a seat section formed with a guide slot, the guide slot having a length at least equal to an allowable displacement of a total travel of the slide rail, a guide member being disposed on the seat section corresponding to the guide slot, an elastic member being connected with the guide member, one end of the elastic member being connected with the shaft member of the gear, the shaft member being further drivable by a driving spring member pivotally connected between the shaft member and the slide seat, whereby the driving spring member applies an action force to the shaft member to make the shaft member displace away from a middle line between the first and second slots.

2. The semiautomatic slide mechanism as claimed in claim 1, wherein at least one of the first and second racks has a deflective transition end formed in a position corresponding to the biased slot.

3. The semiautomatic slide mechanism as claimed in claim 2, wherein the slide rail has a deflective locating slot formed at at least one most distal end of the slide rail and the corresponding rack has a locating end deflected in the same direction as the locating slot.

4. The semiautomatic slide mechanism as claimed in claim 2, wherein the elastic member is a clockwork-type spring.

5. The semiautomatic slide mechanism as claimed in claim 2, wherein guide islands are disposed on the slide seat in parallel to the guide slot for restricting and guiding the guide member.

6. The semiautomatic slide mechanism as claimed in claim 2, wherein the slide board has guide rails extending in the sliding direction of the slide seat and the slide seat has guide channels slidably fitted on the guide rails of the slide board.

7. The semiautomatic slide mechanism as claimed in claim 2, wherein at least one of the first and second slots is a straight slot.

8. The semiautomatic slide mechanism as claimed in claim 2, wherein the first and second slots are two straight slots in parallel to each other.

9. The semiautomatic slide mechanism as claimed in claim 1, wherein the slide rail has a deflective locating slot formed at at least one most distal end of the slide rail and the corresponding rack has a locating end deflected in the same direction as the locating slot.

10. The semiautomatic slide mechanism as claimed in claim 9, wherein the elastic member is a clockwork-type spring.

11. The semiautomatic slide mechanism as claimed in claim 9, wherein guide islands are disposed on the slide seat in parallel to the guide slot for restricting and guiding the guide member.

12. The semiautomatic slide mechanism as claimed in claim 9, wherein the slide board has guide rails extending in the sliding direction of the slide seat and the slide seat has guide channels slidably fitted on the guide rails of the slide board.

13. The semiautomatic slide mechanism as claimed in claim 9, wherein at least one of the first and second slots is a straight slot.

14. The semiautomatic slide mechanism as claimed in claim 9, wherein the first and second slots are two straight slots in parallel to each other.

15. The semiautomatic slide mechanism as claimed in claim 1, wherein the elastic member is a clockwork-type spring.

16. The semiautomatic slide mechanism as claimed in claim 15, wherein guide islands are disposed on the slide seat in parallel to the guide slot for restricting and guiding the guide member.

17. The semiautomatic slide mechanism as claimed in claim 15, wherein the slide board has guide rails extending in the sliding direction of the slide seat and the slide seat has guide channels slidably fitted on the guide rails of the slide board.

18. The semiautomatic slide mechanism as claimed in claim 15, wherein at least one of the first and second slots is a straight slot.

19. The semiautomatic slide mechanism as claimed in claim 15, wherein the first and second slots are two straight slots in parallel to each other.

20. The semiautomatic slide mechanism as claimed in claim 1, wherein guide islands are disposed on the slide seat in parallel to the guide slot for restricting and guiding the guide member.

21. The semiautomatic slide mechanism as claimed in claim 20, wherein the slide board has guide rails extending in the sliding direction of the slide seat and the slide seat has guide channels slidably fitted on the guide rails of the slide board.

22. The semiautomatic slide mechanism as claimed in claim 20, wherein at least one of the first and second slots is a straight slot.

23. The semiautomatic slide mechanism as claimed in claim 20, wherein the first and second slots are two straight slots in parallel to each other.

24. The semiautomatic slide mechanism as claimed in claim 1, wherein the slide board has guide rails extending in the sliding direction of the slide seat and the slide seat has guide channels slidably fitted on the guide rails of the slide board.

25. The semiautomatic slide mechanism as claimed in claim 24, wherein at least one of the first and second slots is a straight slot.

26. The semiautomatic slide mechanism as claimed in claim 24, wherein the first and second slots are two straight slots in parallel to each other.

27. The semiautomatic slide mechanism as claimed in claim 1, wherein at least one of the first and second slots is a straight slot.

28. The semiautomatic slide mechanism as claimed in claim 27, wherein the first and second slots are two straight slots in parallel to each other.

29. The semiautomatic slide mechanism as claimed in claim 1, wherein the first and second slots are two straight slots in parallel to each other.

* * * * *